C. Legros,
Life Boat.
No. 21,570. Patented Sept. 21, 1858.
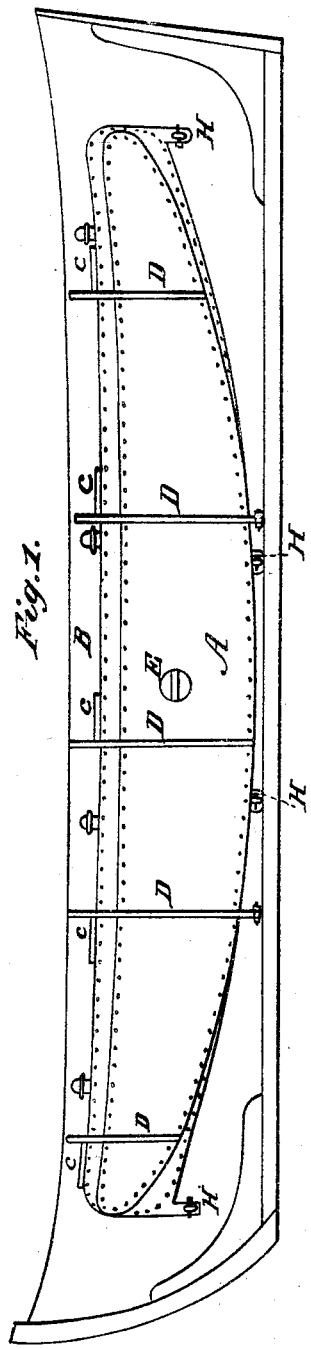
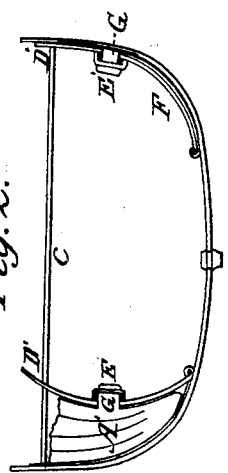

UNITED STATES PATENT OFFICE.

CHAS. LEGROS, OF NEW YORK, N. Y.

EXPANSIBLE FLOAT FOR LIFE-BOATS.

Specification of Letters Patent No. 21,570, dated September 21, 1858.

*To all whom it may concern:*

Be it known that I, CHARLES LEGROS, of the city and county of New York, in the State of New York, have invented a new and useful Improvement in the Construction of Inflatable Floats for Life-Boats; and I do hereby declare that the following is a full and exact description thereof, reference being had to the accompanying drawings and to the letters of reference marked thereon.

The nature of my invention consists in constructing the exposed side surfaces of the float of some non-corrosive metal while its top and unexposed surfaces are formed of rubber or other air proof flexible material. By thus constructing the floats partly of metal they are not so liable to rapid destruction by the contact with them of sharp pointed instruments or from constant use.

To enable others skilled in the art to make and use my invention I will proceed to describe its construction and operation.

I construct my boat in the ordinary form and apply thereto the following apparatus to make it a complete life boat. Upon each side of the boat I fasten a float A in Figure 1, air tight, extending from one end of the boat to the other; this float may be fastened permanently to the side of the boat or it may be attached thereto by means of small bars of iron running through staples in the side of the boat as in letter H, H, H, H, Fig. 1. The two sides of the float may be constructed of galvanized iron, copper or any metal not liable to rust. The sides to be joined together by a strip of india rubber, gutta percha or similar material, united all around each side and made air tight. The floats are to be placed just below the seats, c, c, c, c. In the center of the float E is a short tube extending through the float slightly projecting toward the center of the boat from the outside of the float and upon which a cap screws also air tight. The iron rods D, D, D, D, D, in Fig. 1 run from the bottom of the float to the top of the boat and are fastened to the float as far as the iron or outer covering of the float extends. These bars are fastened to the bottom of the float at their lower end by hinges. The upper portion of the float doubling in and the float lying against the side of the boat as in F Fig. 2, in order to inflate the floats and use the boat as a life boat unscrew the cap E from the tube G Fig. 2, draw the iron bars D, D, D, D, D, inward toward the center of the boat and fasten the head of the bars to a hook on the seats C, C, C, C, C as far toward the center of the boat as the float will extend and again screw on the air tight cap on the tube G, as in A Fig. 2 and it is a life boat. In order to close the float the tube must be again unscrewed and the bars fastened to the side of the boat as before stated when it may be used for an ordinary boat.

What I claim as my invention and desire to secure by Letters Patent, is—

Constructing the outer sides or side surfaces of the floats of some noncorrosive metal, while the top and unexposed surfaces are formed of rubber or other air proof flexible material, substantially as and for the purposes set forth.

CHARLES LEGROS.

Witnesses:
SAM L. TITUS,
WM. H. BALDWIN.